(12) United States Patent
Tsapatsis et al.

(10) Patent No.: US 10,005,674 B2
(45) Date of Patent: Jun. 26, 2018

(54) SILICA SUPPORT STRUCTURE FOR A ZEOLITE MEMBRANE

(71) Applicant: Regents of the University of Minnesota, Minneapolis, MN (US)

(72) Inventors: Michael Tsapatsis, Minneapolis, MN (US); Kumar Varoon Agrawal, Minneapolis, MN (US); Lorraine Francis, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 727 days.

(21) Appl. No.: 14/327,720

(22) Filed: Jul. 10, 2014

(65) Prior Publication Data

US 2015/0376019 A1    Dec. 31, 2015

Related U.S. Application Data

(60) Provisional application No. 62/018,142, filed on Jun. 27, 2014.

(51) Int. Cl.
  *C01B 33/18*     (2006.01)
  *C01B 33/12*     (2006.01)

(52) U.S. Cl.
  CPC .............. *C01B 33/18* (2013.01); *C01B 33/12* (2013.01); *D10B 2101/02* (2013.01)

(58) Field of Classification Search
  CPC ... C01B 33/12–33/193; D10B 2101/02; B32B 2264/1012; B32B 2264/10; B32B 2264/12

USPC ....... 428/331, 404, 446, 448, 450, 451, 452; 423/335–340

See application file for complete search history.

(56) References Cited

U.S. PATENT DOCUMENTS

| 2,243,122 A | 5/1941 | Ramseyer |
| 2,318,243 A | 5/1943 | McClure |
| 2,984,868 A | 5/1961 | Hill |
| 2012/0100364 A1 | 4/2012 | Yoon et al. |
| 2012/0165558 A1 | 6/2012 | Ryoo et al. |
| 2013/0040145 A1 | 2/2013 | Yoon et al. |
| 2013/0149492 A1 | 6/2013 | Yoon et al. |

FOREIGN PATENT DOCUMENTS

| EP | 2418169 | 2/2012 |
| WO | WO 2013/006623 | 1/2013 |

OTHER PUBLICATIONS

Agrawal, K. V., Oriented MFI Membranes by Gel-Less Secondary Growth of Sub-100 nm MFI-Nanosheet Seed Layers. Adv. Mater., 27: 3243-3249. doi:10.1002/a Apr. 11, 2015.*

Wypych, G., Handbook of Fillers, 3rd Ed. 2010, pp. 245-246.*

(Continued)

*Primary Examiner* — Frank J Vineis
(74) *Attorney, Agent, or Firm* — Fish & Richardson P.C.

(57) ABSTRACT

A process for making a mechanically strong, high permeance, and relatively inexpensive support structure for zeolite membranes is described. In an example implementation, a process includes forming a silica powder from silica fibers, mixing the silica powder and a polymer solution to form a mixture, forming the mixture into a shaped mixture, and sintering the shaped mixture to form a silica support.

4 Claims, 10 Drawing Sheets

(56) References Cited

OTHER PUBLICATIONS

ASTM C1499-15, Standard Test Method for Monotonic Equibiaxial Flexural Strength of Advanced Ceramics at Ambient Temperature, ASTM International, West Conshohocken, PA, 2015.*
Pham, T. Gel-Free Secondary Growth of Uniformly Oriented Silica MFI Zeolite Films and Application for Xylene Separation . Angew. Chem. Int. Ed., 52: 8693-8698. doi:10.1002/anie.201301766; Supporting Information, pp. 1-16 Jul. 5, 2013.*
Agrawal et al., "Solution-processable exfoliated zeolite nanosheets purified by density gradient centrifugation," *AIChE Journal*, 59(9): 3458-3467, Sep. 2013.
Burggraaf et al., "Permeation of single gases in thin zeolite MFI membranes," *Journal of Membrane Science*, 144(1-2): 77-86, Jun. 1998.
Choi et al., "Grain boundary defect elimination in a zeolite membrane by rapid thermal processing," *Science*, 325(5940):590-593, Jul. 31, 2009.
Dong et al., "Template-removal-associated microstructural development of porous-ceramic-supported MFI zeolite membranes," *Microporous and Mesoporous Materials*, 34(3): 241-253, Mar. 2000.
Hedlund et al., "A masking technique for high quality MFI membranes," *Journal of Membrane Science*, 222(1-2): 163-179, Sep. 1, 2003.
Koros and Fleming, "Membrane-based gas separation," Section Title: Unit Operations and Processes, 83(1): 1-80, Aug. 12, 1993.
Lai et al., "Microstructural optimization of a zeolite membrane for organic vapor separation," *Science*, 300(5618):456-460, Epub Mar. 6, 2003.
Mitra et al., "Synthesis and corrosion resistance of high-silica zeolite MTW, BEA, and MFI coatings on steel and aluminum," *Journal of the Electrochemical Society*, 149(10): B472-B478, 2002.
Nakazawa et al., "Early stages of MFI film folination," *Microporous and Mesoporous Materials*, 21(4-6): 325-332, May 1998.
Park et al., "Effect of silica particle size on performance of porous stainless-steel-supported silica membranes prepared by the DRFF and SRFF method," *Industrial & Engineering Chemistry Research*, 47(16): 6211-6215, 2008.
Pham et al., "Gel-free secondary growth of uniformly oriented silica MFI zeolite films and application for xylene separation," *Angew Chem Int Ed Engl.*, 52(33):8693-8698, Jul. 5, 2013.
Pham et al., "Growth of uniformly oriented silica MFI and BEA zeolite films on substrates," *Science*, 334(6062):1533-1538, Dec. 16, 2011.
Sano et al., "Separation of ethanol-water micture by silicalite membrane on pervaporation," *Journal of Membrane Science*, 95(3): 221-228, Nov. 14, 1994.
Shan et al., "Preparation of zeolite MFI membranes on alumina hollow fibers with high flux for pervaporation," *Journal of Membrane Science*, 378(1-2): 319-329, Aug. 15, 2011.
Shqau et al., "Preparation and properties of porous alpha-Al2O3 membrane supports," *Journal of the American Ceramic Society*, 89(6): 1790-1794, Apr. 28, 2006.
Stöber et al., "Controlled growth of monodisperse silica spheres in the micron size range," *Journal of colloid and interface science*, 26, 62-69 (1968).
Tsapatsis, "Toward high-throughput zeolite membranes," *Science*, 334(6057): 767-768, Nov. 11, 2011.
Tsapatsis, "Materials science. Toward high-throughput zeolite membranes," *Science*, 334(6057):767-768, Nov. 11, 2011.
Varoon et al., "Dispersible exfoliated zeolite nanosheets and their application as a selective membrane," *Science*, 334(6052):72-75, Oct. 7, 2011.
Voss et al., "Butene isomers separation on titania supported MFI membranes at conditions relevant for practice," *Journal of Membrane Science*, 329(1-2):11-17, Mar. 5, 2009.
Xomeritakis et al., "Growth, microstructure, and permeation properties of supported zeolite (MFI) films and membranes prepared by secondary growth," *Chemical Engineering Science*, 54(15-16): 3521-3531, Jul. 1999.

* cited by examiner

SILICA SUPPORT STRUCTURE FOR A ZEOLITE MEMBRANE

CROSS-REFERENCE TO RELATED APPLICATIONS

This application claims benefit of priority from U.S. Provisional Application Ser. No. 62/018,142, filed on Jun. 27, 2014.

STATEMENT OF GOVERNMENT SUPPORT

This invention was made with government support under DE-AR0000338 awarded by Department of Energy. The government has certain rights in the invention.

BACKGROUND

This disclosure relates to porous silica membranes, and more particularly to silica support structures for supporting zeolite membranes.

BACKGROUND

Separation-based technologies play a significant role in industries such as chemical and petroleum refining. Membrane-based separations are often attractive due to low operating cost compared with other separation processes like distillation. In some applications, zeolite membranes are particularly attractive due to their thermal and chemical stability and potential to attain high throughput. Despite being the subject of extensive research efforts, zeolite-based membranes are often limited to small- to mid-scale industrial applications. One major barrier to the large-scale deployment of zeolite membranes is their high cost; a major component of this cost is that of the porous support structure needed to mechanically support a zeolite membrane during fabrication and subsequent use.

SUMMARY

Various aspects of the invention are summarized as follows:

In general, in an aspect, a method for making a silica support includes forming a silica powder from silica fibers, mixing the silica powder and a polymer solution to form a mixture, forming the mixture into a shaped mixture, and sintering the shaped mixture to form the silica support.

Implementations of this aspect may include one or more of the following features:

In some implementations, the silica powder can be formed by pressing the silica fibers. The silica fibers can be pressed using a hydraulic press. The silica fibers can be pressed with a pressure in a range from 10 to 150 MPa, for example.

In some implementations, the polymer solution can be an aqueous solution. The polymer solution can include poly (vinyl alcohol). The polymer solution can be a 0.5% poly (vinyl alcohol) solution.

In some implementations, the polymer solution can bind the silica powder while the mixture is formed into the shaped mixture.

In some implementations, the shaped mixture can be formed by compaction of the mixture. The polymer solution can facilitate uniform compaction of the silica powder while the mixture is formed into the shaped mixture. The mixture can be compacted by pressing the mixture. The mixture can be pressed using a hydraulic press. The mixture can be pressed with a pressure in a range from 10 to 150 MPa.

In some implementations, the shaped mixture can be sintered at a temperature of 1,100° C. or more. In some cases, the shaped mixture can be sintered at a temperature of about 1,200° C. or more. In some cases, the shaped mixture can be sintered at a temperature in a range from 1,200° C. to 1,500° C. In some cases, the shaped mixture can be sintered at a temperate and for a time sufficient to fuse the silica powder while retaining pores.

In some implementations, the method can further include treating a surface of the silica support to reduce a roughness of the surface. Treating the surface can include rubbing the surface with a second silica powder, and re-sintering the silica support structure. The second silica powder can include silica particles having a diameter in a range from approximately 200-1000 nm. Re-sintering the silica support structure can include heating the silica support structure in a range from 500° C. to 1,200° C. Treating the surface can further include coating the silica support structure with a silica suspension, and re-sintering the silica support structure. The silica suspension can be an aqueous suspension of silica. Re-sintering the silica support structure can include heating the silica support structure in a range from 500° C. to 1,200° C. Treating the surface can further include rubbing the surface with a third silica powder, and heat treating the silica support structure. In some cases, the third silica powder can include silica particles having a diameter of approximately 50 nm. Heat treating the silica support structure can include heating the silica support structure in a range from 400° C. to 600° C.

In general, in another aspect, a silica support includes a porous layer of interconnected silica particles suitable for supporting a zeolite membrane, where the layer has a nitrogen permeance in a range of approximately $3 \times 10^{-5}$ to $8 \times 10^{-5}$ mol/m$^2$ sPa.

Implementations of this aspect may include one or more of the following features:

In some implementations, the interconnected silica particles can be randomly oriented. The layer of interconnected silica particles can have inter-particle gaps that are less than 10 μm. The layer of interconnected silica particles can include interconnected anisotropic silica fibers. Each anisotropic silica fiber can have an aspect ratio in the range of approximately 2 to 10. The silica support can have a bi-axial flexural strength of approximately 20 MPa.

Among other advantages, the disclosed methods may be used to form mechanically strong, high permeance, and relatively inexpensive support structures for zeolite membranes.

The details of one or more implementations are set forth in the accompanying drawings and the description below. Other aspects, features, and advantages of the invention will be apparent from the description and drawings, and from the claims.

DETAILED DESCRIPTION

"Zeolites" refer to a group of crystalline aluminosilicates. In an aluminosilicate skeleton, aluminum bonding sites generally bear negative charges. Thus, cations for compensating the negative charges are often present within pores of the aluminosilicate skeleton. The remaining space of the pores is usually filled with water molecules. The three-dimensional pore structure, shape and size of a zeolite generally depends upon the type of the zeolite, and the pore diameter is typically on a molecular scale. Therefore, a membrane of zeolite is often called a "molecular sieve" because of its size selectivity or shape selectivity for molecules entering the pores. Different zeolites may filter different molecules, according to the zeolite structure and composition.

Many zeotype molecular sieves are known in which silicon (Si) and aluminum (Al) atoms constituting the skeletal structure of zeolite are partially or wholly replaced by various other elements. Examples of known zeotype molecular sieves include porous silicalite-based molecular sieves free of aluminum, AlPO4-based molecular sieves in which silicon is replaced by phosphorus (P), and other molecular sieves in which the skeletal constituent elements are partially substituted with various metal atoms such as Ti, Mn, Co, Fe and Zn. These zeotype molecular sieves are materials derived from zeolites, and do not belong to zeolite groups based on the mineralogical classification but are commonly called as zeolites in the art. Accordingly, the term "zeolite membrane" as used herein is intended to include the above-mentioned zeotype molecular sieves in addition to zeolite membranes having a skeletal structure composed only of silicon and aluminum.

Figure 1:
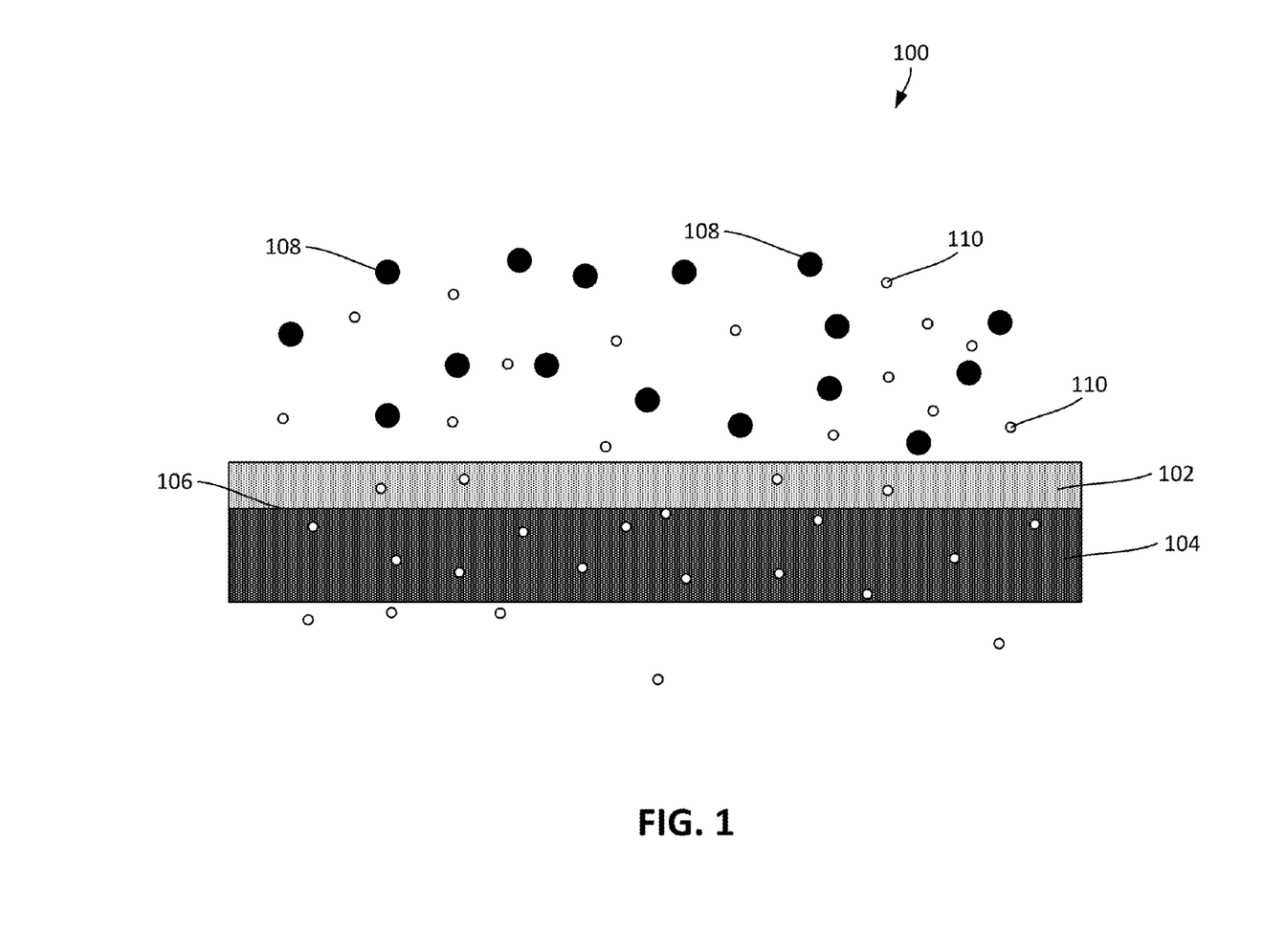
FIG. 1 shows a diagram of an example membrane structure having a zeolite membrane and a support structure.

An example membrane structure 100 is shown in FIG. 1. The membrane structure 100 can be used, for example, to separate certain molecules (e.g., the molecules 108) from certain other molecules (e.g., the molecules 110), by allowing some molecules to pass through it, while preventing other particles from doing the same.

The membrane structure 100 includes a zeolite membrane 102 and a support structure 104. In this example, the zeolite membrane 102 has been deposited onto a surface 106 of the support structure 104. In some implementations, the support structure 104 can have greater mechanical strength than the zeolite membrane 102, and thus can be used to provide mechanical support for the zeolite membrane 102 and for the membrane structure 100 as a whole. For example, the support structure 104 can be used to define a particular shape for the zeolite membrane 102 and the membrane structure 100, and to maintain that shape when the zeolite membrane 102 and the support structure 104 are subjected to various mechanical forces.

As described above, the zeolite membrane 102 is porous, and due to its particular pore structure, can allow certain types of molecules to pass through it (e.g., molecules of a particular size and conformation), while preventing others from passing through (e.g., molecules of a different size or conformation). For example, as shown in FIG. 1, the molecules 108 are prevented from passing through the zeolite membrane 102, while the molecules 110 are able to pass through. Accordingly, a zeolite membrane 102 can be designed to have particular pores (e.g., pores of particular size and shapes) in order to separate certain types of molecules from certain other types of molecules. As an example, zeolite membranes 102 can be designed for the separation of organic vapors (e.g., butane/iso-butane, xylene isomers), and for the dehydration of alcohols (e.g., ethanol/water).

Like the zeolite membrane 102, the support structure 104 can also be porous in order to allow for the passage of molecules. For example, as shown in FIG. 1, the support structure 104 is also porous, such that molecules 110 passing through zeolite membrane 102 can also pass through the support structure 104. In some implementations, the support structure 104 can be composed, either partially or entirely, of silica.

In addition to allowing for the passage of certain molecules, the support structure plays a significant role in determining the zeolite membrane's microstructure (e.g., the structure of its pores), performance (e.g., its permeance with respect to certain types of materials, or the degree to which it admits a flow of matter), and mechanical strength. Further, in some applications, during the manufacture of a membrane structure, the zeolite membrane is deposited onto a surface of the support structure. Thus, in some implementations, the support structure must also be suited for the deposit of zeolite, such that the zeolite membrane is effectively formed on the support structure.

A support structure might be suitable for supporting a zeolite membrane due to particular characteristics. For example, a support structure might have a thermal expansion coefficient that is similar to that of the zeolite membrane that it is supporting. This similarity can potentially reduce or eliminate crack formation during the thermal activation of the zeolite membrane. For instance, a silica support structure can be used to support a siliceous zeolite membrane, where the silica support structure and the siliceous zeolite membranes have similar thermal expansion coefficients. As another example, a support structure might be composed of certain types of materials that make it more suitable for use with certain desirable types of zeolite membranes. For instance, the use of alumina-based supports might cause aluminum to be incorporated into the zeolite membrane during membrane synthesis. In contrast, the use of silica supports allows for the fabrication of all-silica (or substantially all-silica) zeolite membranes that are free of aluminum. In some implementations, compared to zeolite membranes containing aluminum, all-silica zeolite membranes have comparatively better performance, e.g., display better stability to deactivation/fouling by coke formation.

The dimensions of the zeolite membrane 102 can vary. For example, in some implementations, the zeolite membrane 102 can have a thickness of approximately 2 nm-100 micron. Zeolite membrane 102 can be of different shapes (e.g., circular, square, rectangular, etc.). The zeolite membrane 102 need not be flat. For example, in some implementations, the zeolite membrane 102 can have different three-dimensional conformations other than a flat sheet (e.g., tubular, etc.).

The dimensions of the silica support structure 104 can also vary. For example, in some implementations, the silica support structure 104 can have a thickness of approximately 100 micron to 1 cm. The silica support structure 104 can be of different shapes (e.g., circular, square, rectangular, etc.). Like the zeolite membrane 104, the silica support structure 104 need not be flat. For example, in some implementations, the silica support structure 104 can have different three-dimensional conformations other than a flat sheet (e.g., tubular, hollow fiber, etc.).

Figure 2:
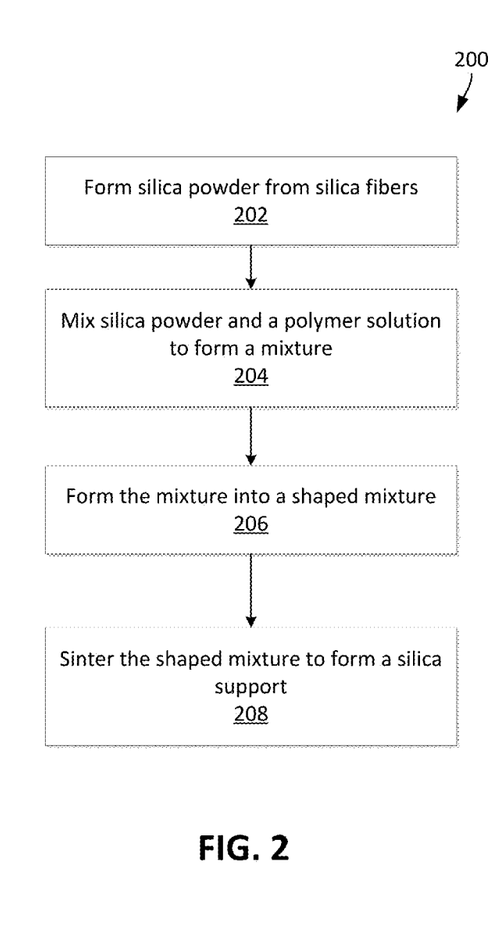
FIG. 2 shows an example process for manufacturing a support structure suitable for supporting a zeolite membrane

An example process 200 for manufacturing a support structure suitable for supporting a zeolite membrane is shown in FIG. 2.

The process 200 begins by forming silica powder from silica fibers (step 202). For instance, in some implementations, silica powder can be formed by pressing a silica fiber with sufficient force to break the silica fibers into powder-like particles, and with sufficient force to form a compact with roughly uniform density. Silica fibers can be pressed, for example, using a hydraulic press.

In general, silica fiber includes long thin threads made of quartz glass (also known as fused quartz). They can be made such that they are substantially silica (e.g., 99.99% silica).

In an exemplary implementation, silica fiber (e.g., commercially-available quartz wool, having a nominal diameter in the range from 1-15 microns, such as 2 microns, 4 microns, 9 microns, 10 microns, etc.) can be pressed using a hydraulic press (e.g., a hydraulic press having a disc-shaped die having a diameter of 1") using a pressure of 100 MPa for 60 seconds. The die diameter, the pressure force, and the duration of time in which the silica fiber is pressed can vary, depending on the application. For example, in some implementations, a silica fiber can be pressed with a pressure in a range from 10 to 150 MPa.

Figure 3A:
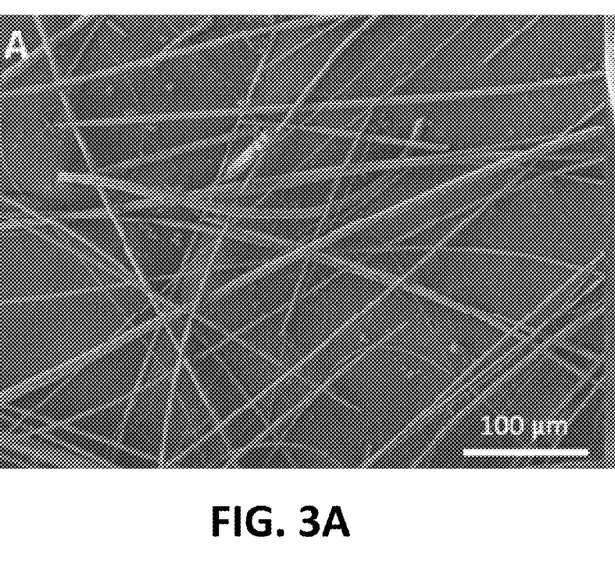
FIGS. 3A-B show scanning electron microscope (SEM) images of example silica fibers.
Figure 3B:
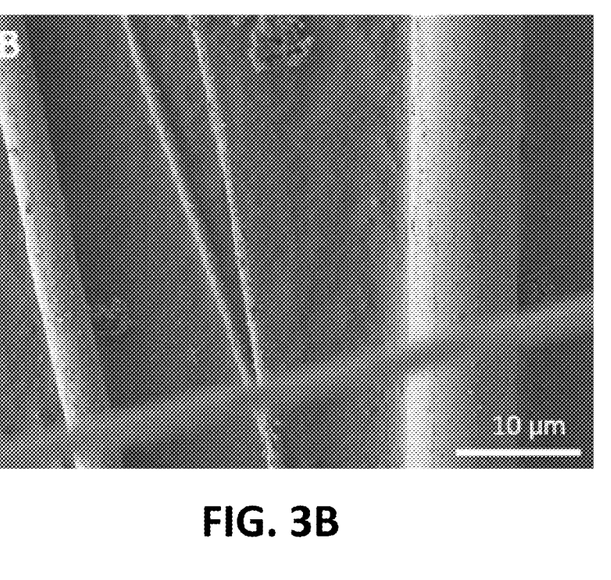

Silica fiber (e.g., quartz wool) is a refractory material and, for example, is commonly used in application such as high temperature insulation. In an example production process of silica fiber, high purity silica is melted, and extruded out of spinning orifices. As a result of centrifugal force, the molten silica comes out of the orifice in the shape of fiber. The fiber solidifies when it comes in contact with the cold air. FIGS. 3A-B show scanning electron microscope (SEM) images of example silica fibers under two different levels of magnification. In this example, most of the fibers are longer than 1 mm in length, whereas their diameter vary between 1 μm to 10 μm, making their aspect-ratio (length/diameter) larger than 100. Silica fibers having other dimensions and aspect-ratios can also be used, depending on the implementation.

After a silica powder is formed from silica fibers, the silica powder is mixed with a polymer solution to form a mixture (step 204). Mixing the silica powder with a polymer solution can provide various benefits. As an example, in some implementations, mixing the silica powder with a polymer solution can facilitate uniform compaction of the silica powder in subsequent processing steps. As another example, in some implementations, the polymer solution can be used as a binder and can provide mechanical strength for the pressed silica powder. In some implementations, the polymer solution can be either an aqueous solution or an organic solution. In some cases, the polymer solution can contain poly(vinyl alcohol) (PVA) having a particular concentration; for example, the polymer solution can be a 0.5% (w/w) solution of PVA in water. Various amounts of the polymer solution can be used, depending on the amount of silica powder used, the concentration of the polymer solution, the shape of the pressed silica powder, and other factors. In an exemplary implementation, for 1.7 g of powder silica fiber that will be subsequently pressed within a hydraulic press having a disc-shaped die having a diameter of 1", the powder silica can be mixed with approximately 12 drops of a 0.5% (w/w) solution of PVA in water prior to being pressed. Mixing can be carried out, for example, by pouring the PVA solution on silica fiber powder, followed by gently whisking the wet powder using a spatula, yielding a semi-wet cake of the silica fiber. The powder silica can be mixed with the PVA solution prior to being placed in the die, or it can be placed into the die and subsequently mixed with PVA solution.

After mixing the silica powder with a polymer solution to form a mixture, the mixture is formed into a shaped mixture (step 206). In some implementations, the shaped mixture can have a shape and size that is similar (e.g., the same or approximately the same) as the desired shape and size of the finished support structure. The mixture can be formed into a shaped mixture using a variety of techniques. For example, the shaped mixture can be formed by compaction of the mixture. Compaction, for example, can be performed by pressing the mixture (e.g., using a hydraulic press) with a particular force. If a hydraulic press was used to create silica powder (e.g., as described in step 202), the same operating parameters need not be used during the forming process. For instance, in some exemplary implementation, the mixture of silica and polymer solution can be pressed 100 MPa for 60 seconds in a hydraulic press having a disc-shaped die having a diameter of 22 mm. The die diameter, the pressure force, and the duration of time for which the mixture is pressed can vary, depending on the application. For example, in some implementations, a mixture can be pressed with a pressure in a range from 10 to 150 MPa. In some cases, pressing with a force exceeding this range might lead to further breaking of fiber or might result in internal cracks.

In some implementations, the shaped mixture can be dried for a period of time before performing any subsequent steps. For example, in some implementations, the shaped mixture can be dried at 70° C. for 12 hours. The amount of time that the shaped mixture is dried and the temperature at which the shaped mixture is dried can vary, depending on the implementation.

After forming the mixture into a shaped mixture, the shaped mixture is sintered to form a silica support structure (step 208). Sintering is a technique by which a material is heated and/or pressurized without melting the material (e.g., heated or pressurized such that the material remains below its melting point). The shaped mixture can be sintered at a temperate, at a pressure, and for a time sufficient to fuse the silica powder while retaining pores. The particular temperature, pressure, and length of time that the material is heated or pressurized can vary, depending on the application. For example, in some implementations, the shaped mixture can be heated at standard atmospheric pressure (e.g., approximately 14.7 psi). In another example, in some implementations, the shaped mixture can be heated to a temperature of 1,100° C. or more (e.g., 1,100° C. or more, or 1,200° C. or more), or in the range from about 1,200° C. to about 1,500° C. In some implementations, the shaped mixture can be heated for approximately 1-5 hours (e.g., 3 hours). In one exemplary implementation, the shaped mixture can be heated for 3 hours at 1230° C. Heating and subsequent cooling can be performed according to specific rates, depending on the implementation. For example, in some implementations, the heating rate can be approximately 2° C./minute, such that the temperature is increased by this heating rate until it reaches a particular sintering temperature or range of temperatures, and is maintained for the duration of sintering. As another example, the cooling rate can be approximately 4° C./minute, such that the temperature is decreased by this cooling rate until it reaches a particular end temperature or range of temperatures. Other heating and cooling rates can be used, depending on the implementation.

Figure 4A:
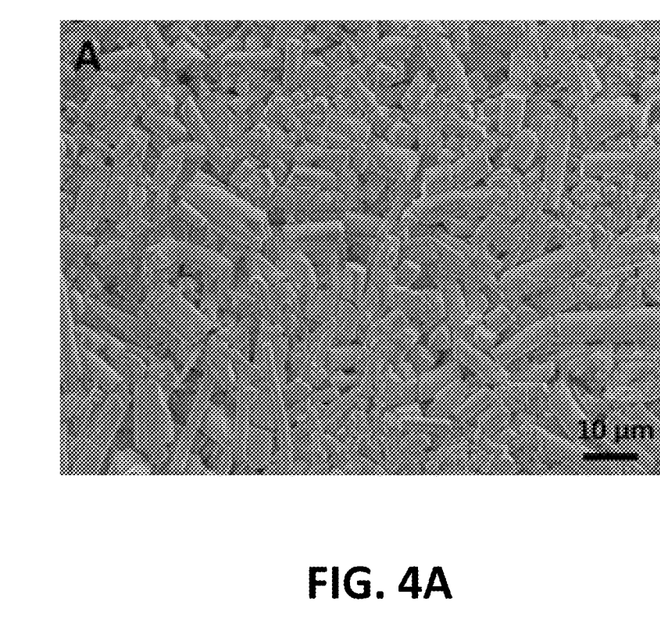
FIG. 4A shows an SEM image of an example silica support structure formed by an implementation of the process shown in FIG. 2.

FIG. 4A shows an SEM image of an example silica support structure formed by an implementation of the process 200. As shown in FIG. 4A, the silica support structure includes interconnected anisotropic silica fibers, where fragments of silica fibers are oriented in the plane of the support surface. This can be attributed to the pressure induced alignment during the die pressing. In some implementations, the fragments of silica fibers can each have an aspect ratio (e.g., the ratio between its length and its width) in the range of about 2-10, while the original unfragmented fibers might have an aspect ratio in the range of about 100-200. Interparticle gaps appear to be less than 10 μm. Due to high interconnectivity of silica fibers, and high sintering temperature (e.g., 1230° C.), the silica support structure is mechanically strong. Further, the silica particles that make up the silica support structure do not excessively shrink, and are less susceptible to crack formation due to shrinkage. Hence, mechanically strong silica support structures, for example the structure shown in FIG. 4A, are attractive for industrial deployment of zeolite membranes.

In some implementations, a surface of the silica support can be treated in order reduce a roughness of the surface. Reducing the roughness can, for example, make the surface more suitable for subsequent zeolite deposition. Treating the surface of the silica support can also change the shape and sizes of pores on the surface, and can, for example, change the shape and sizes of pores so that they are more desirable for a particular application.

In some implementations, the silica support structure can be treated by polishing one or more of its surfaces. Polishing can be performed, for example, by rubbing the surfaces with a polishing material (e.g., a polishing paper). The properties of the polishing material can vary, depending on the application. In one exemplary implementation, the surfaces of the silica support structure can be polished with a silicon carbide polishing paper (e.g., having a grit of 600) in order to reduce the roughness of those surfaces. After polishing, the silica support structure can be re-sintered. Re-sintering the silica support structure can, for example, bond fragmented silica fibers that were generated during polishing to the opening of the membranes, thereby further reducing the surface roughness. In some cases, re-sintering the silica support structure can also bind the rubbed silica on the support surface. As an example, the silica support can be re-sintered at standard atmospheric pressure at 1200° C. for 3 hours. As with the initial sintering step (e.g., step 208), the particular temperature, pressure, and length of time that the material is heated or pressurized can vary, depending on the application.

Figure 4B:
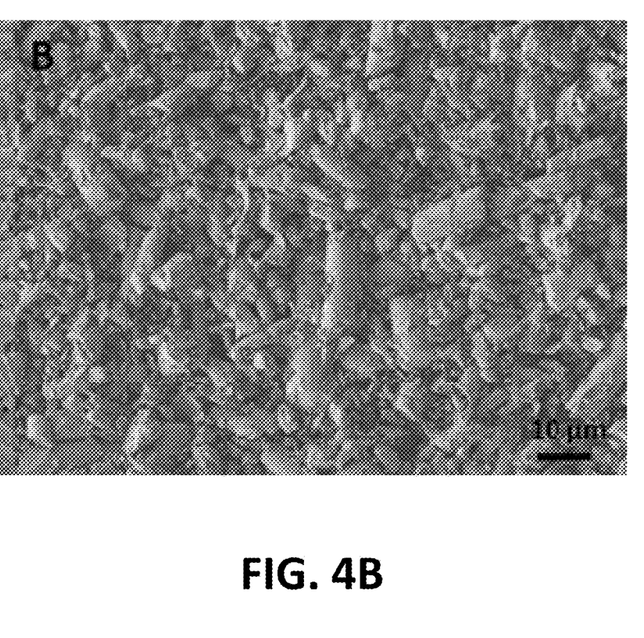
FIG. 4B shows an SEM image of an example silica support structure that has been polished and re-sintered.
Figure 5:
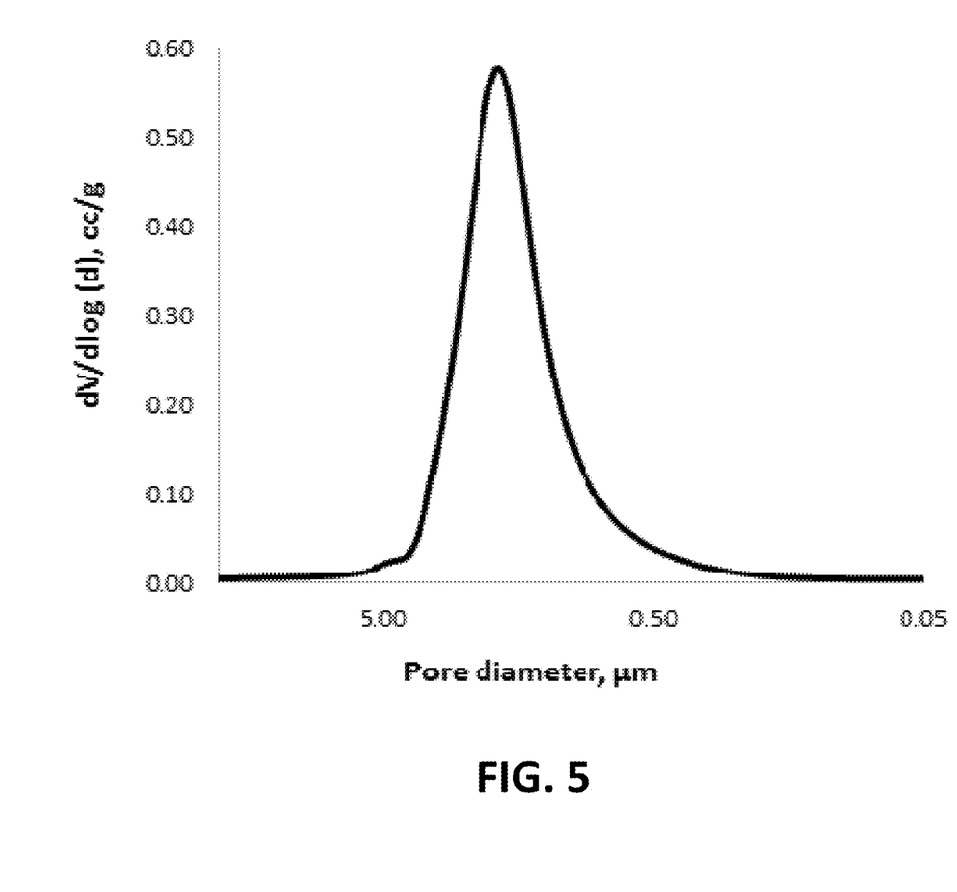
FIG. 5 shows the pore size distribution of an example silica support structure that has been polished and re-sintered.

FIG. 4B shows an SEM image of an example silica support structure that has been polished and re-sintered (e.g., as described above). FIG. 5 shows the pore size distribution of another example silica support structure that has been polished and re-sintered. In this example, more than 90% of the pore diameters lie between 0.5 to 5 μm. In some implementations, large pore diameters are desired to achieve a high viscous flow through the support. Based on mercury porosimetry, pore volume per unit mass for this example was 0.2542 cc/g, corresponding to 35.9% porosity. This is comparable to the porosity of ceramic supports often used for fabrication of zeolite membranes.

In some implementations, the surface of a silica support structure can be treated by rubbing the surface with silica powder (e.g., a silica powder that is either similar or different than the silica powder described above). This rubbing technique can be performed either as an alternative to or in addition to polishing, as described above. As an example, the surface of a silica support structure can be rubbed with silica particles (e.g., sintered Stöber silica particles) having a diameter in the range of approximately 200-1000 nm (e.g., 500 nm). These silica particles can be, for example, pre-sintered Stöber silica particles produced using the techniques described below. Other types of particles and differently sized particles can be also be used, depending on the implementation. Rubbing can be carried out on both dry or wet silica support surfaces. In some cases, rubbing on a wet surface can lead to higher deposition of silica particles. After rubbing, the silica support structure can be re-sintered. As above, re-sintering the silica support structure can, for example, bond fragmented silica fibers that were generated during rubbing or polishing to the opening of the membranes, thereby further reducing the surface roughness. Similarly, the re-sintering can also bond the rubbed silica particles onto the surface of the silica support structure. As an example, the silica support, rubbed with sintered Stöber silica particles having a diameter of 500 nm, can be re-sintered at standard atmospheric pressure at 1100° C. for 3 hours. As with the initial sintering step (e.g., step 208), the particular temperature, pressure, and length of time that the material is heated or pressurized can vary, depending on the application. As an example, in some implementations, a silica support structure can be heated in a range from about 500° C. to 1,200° C. after rubbing with silica powder.

Figure 6A:
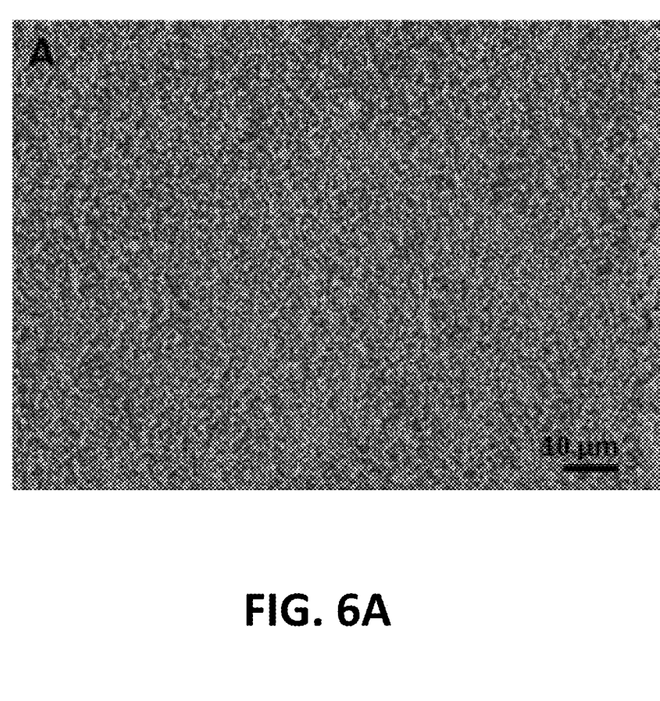
FIGS. 6A-B show SEM images of an example polished silica support structure rubbed with silica particles.

FIG. 6A shows an SEM image of an example polished silica support structure rubbed with 500 nm silica particles. As shown in FIG. 6A, the pore openings of underlying silica fiber supports are covered with silica spheres, reducing the surface roughness of the support.

Figure 6B:
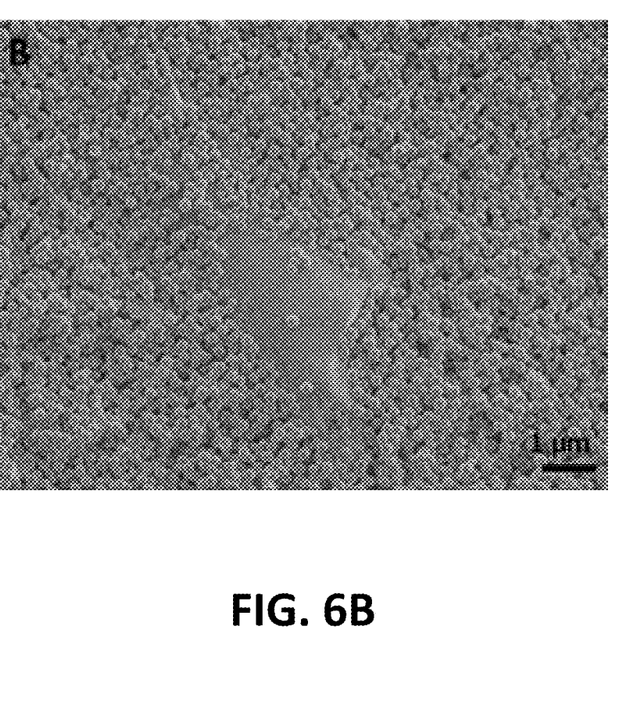

In some cases, protruding silica fibers might be present on the surface of a silica support structure. For example, FIG. 6B shows an SEM image of an example silica support with a protruding silica fiber. These protruding silica fibers can be detrimental to the fabrication of a zeolite membrane. For example, a thin zeolite membrane that is deposited onto the surface of the silica support structure (e.g., a sub-100 nm thin membrane) might not cover the impervious protruding silica fibers. These protrusions can be eliminated, for example, using the techniques described below.

In some implementations, the surface of a silica support structure can be treated by coating the silica support structure with a sintered silica suspension (e.g., by slip casting a suspension of sintered Stöber silica produced using the techniques described below). Slip casting a silica support structure in this manner can provide more uniform coverage of silica particles to the surface of the silica support structure, and can make the silica support structure more suitable for zeolite membrane formation (e.g., in the case of thin membranes). Slip casting is a process by which a liquid (i.e., a "slip") is poured into a mold and allowed to form a layer (i.e., a "cast") on the inside cavity of the mold. Slip casting can be performed in a variety of ways. In one exemplary implementation, a silica support structure is coated with a sintered silica suspension using vacuum assisted filtration. The filter coating is performed while sealing the top and bottom surfaces of the support (e.g., by using a set of silicone O-rings). A low vacuum (e.g., approximately 10

KPa) is used during filtration. The sintered silica suspension can be, for example, an aqueous suspension of sintered silica (e.g., an aqueous suspension of pre-sintered Stöber silica particles). The particles of the suspension can differ in size. For example, in some implementations, the particles can have a diameter of approximately 200-1000 nm (e.g., 500 nm).

After slip casting, the slip cast silica support structure can be dried and re-sintered. As described above, drying can vary, depending on application. For example, in some implementations, the silica support structure can be dried at 70° C. for approximately 3 hours. As also described above (e.g., in reference to the initial sintering of step 208), the particular temperature, pressure, and length of time that the material is heated or pressurized during re-sintering can vary, depending on the application. As an example, in some implementations, a silica support structure can be heated to approximately 1050° C. for 3 hours. In another example, the silica support structure can be heated in a range from about 500° C. to 1,200° C.

Although the silica support structure can be coated with a sintered silica suspension using slip casting techniques, this is merely one exemplary implementation. In some cases, the silica support structure can be coated using other coating techniques.

In some implementations, the use of a mild vacuum (e.g., 0.1 atm) during slip casting can be used to reduce the deposition rate, and can improve the uniformity of coating. For example, in some implementations, no large cracks appear at the surface of the silica support after slip casting using mild vacuum and subsequent re-sintering. In some implementations, the use of pre-sintered silica particles can help in eliminating surface cracks. Further, in some implementations, if may be necessary to first rub the silica support structure with silica particles (e.g., using silica particles having diameters between 200-1000 nm, such as 500 nm), as described above, before slip casting the silica support with a silica suspension. For example, in some implementations, without first rubbing the silica support structure with 500 nm diameter silica particles, the silica suspension might flow through the silica support structure without forming a cast.

Figure 7A:
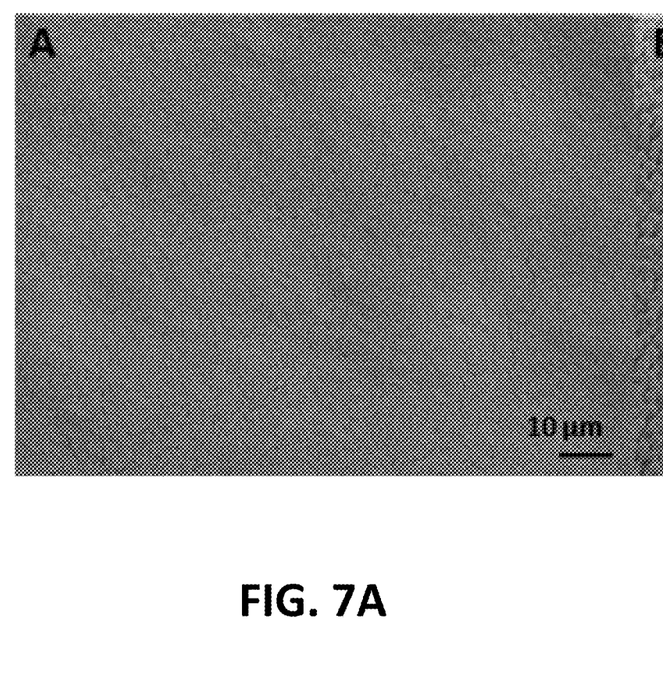
FIGS. 7A-B show SEM images of an example silica support structure that has been rubbed with silica powder and slip cast with a sintered silica suspension.
Figure 7B:
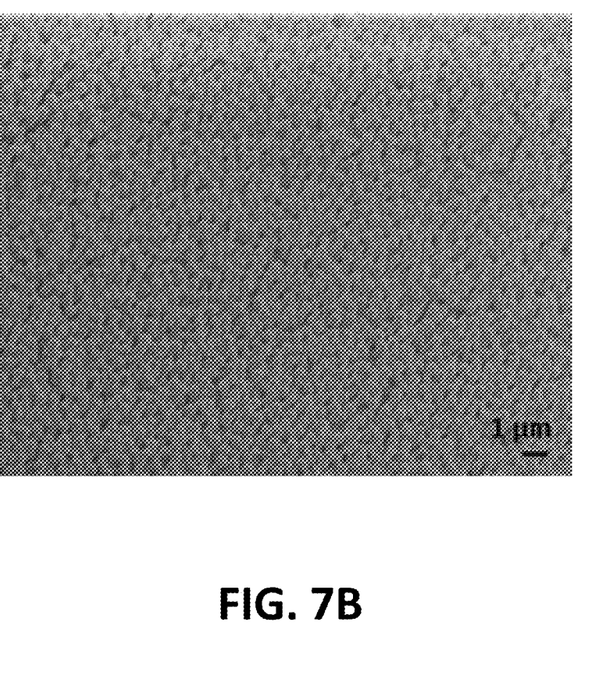

FIGS. 7A-B show SEM images of an example silica support structure that has been rubbed with silica powder having 500 nm diameter particles, and subsequently slip cast with a sintered silica suspension, under two different levels of magnification. As shown under high level magnification (FIG. 7B), the slip cast silica support structure has a generally uniform surface.

In some implementations, the surface of a silica support structure can be treated by rubbing the surface with another silica powder (e.g., a silica powder that is either similar to or different than the silica powders described above). This rubbing technique can be performed either as an alternative to or in addition to polishing, as described above. As an example, the surface of a silica support structure can be rubbed with silica particles having a diameter of approximately 50 nm. These silica particles can be, for example, pre-sintered Stöber silica particles produced using the techniques described below. Other types of particles and differently sized particles can be also be used, depending on the implementation. After rubbing, the silica support structure can be re-sintered. As above, the re-sintering can bond the rubbed silica particles onto the surface of the silica support structure, thereby further reducing the surface roughness. As an example, the silica support can be re-sintered at standard atmospheric pressure at 480° C. for 6 hours. As with the initial sintering step (e.g., step 208), the particular temperature, pressure, and length of time that the material is heated or pressurized can vary, depending on the application. As an example, in some implementations, a silica support structure can be heated in a range from about 400° C. to 600° C. after rubbing with silica powder.

Figure 8A:
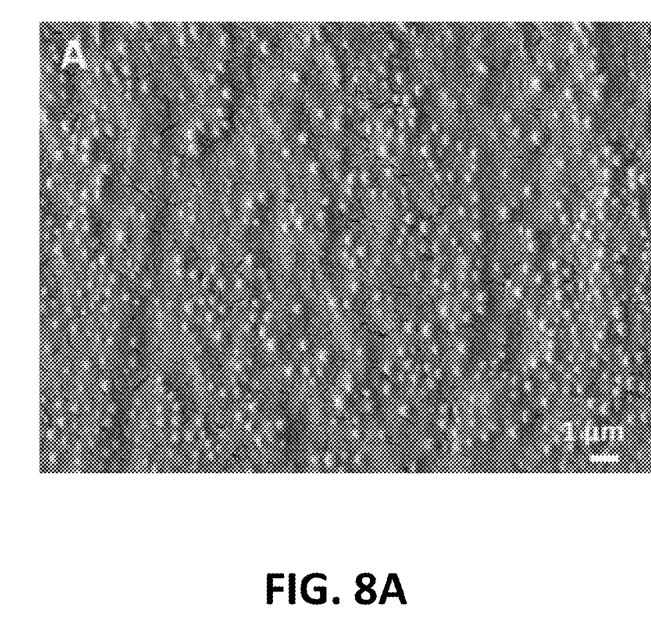
FIGS. 8A-B show SEM images of an example silica support structure that has been rubbed with silica powder, slip cast with a sintered silica suspension, and rubbed with another silica powder.
Figure 8B:
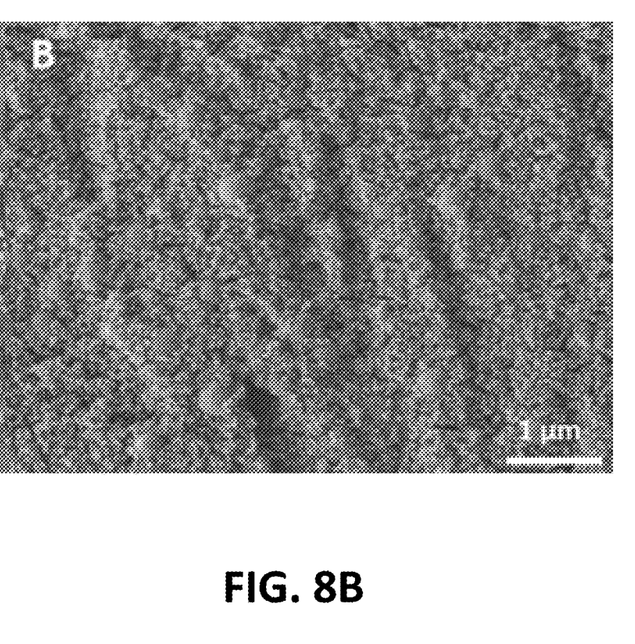

FIGS. 8A-B show SEM images of an example silica support structure that has been rubbed with silica powder having 500 nm diameter particles, slip cast with a sintered silica suspension, and subsequently rubbed with silica powder having 50 nm diameter particles, under two different levels of magnification. As shown in under high level magnification (FIG. 8B), a few 500 nm sized silica particles can be observed on the surface, indicating that the coating of 50 nm sized silica particles is not very thick. A thin coating of 50 nm spheres is desirable in some implementations, as it can reduce the probability of crack formation on the support surface.

After the formation of the silica support structure (e.g., using an implementation of the process 200) and, if desired, after the treatment of the surface of the silica support structure (e.g., using one or more of the treatment techniques described above), the zeolite membrane can be formed onto one or more surfaces of the silica support structure. As instance, development of a purified suspension carrying 3 nm thick, large-aspect-ratio sheets (MFI-nanosheets) enables the deposition of a thin coating of zeolite on porous support for fabrication of high performance membrane. In an example implementation, a surface of a silica support structure can be coated with a pre-calibrated amount of MFI-nanosheet suspension to obtain an approximately 50 nm thick MFI film. The coating can be dried at 70° C. for 3 hours, 150° C. for 3 hours, and calcined at 480° C. for 6 hours with the heating and cooling rate of 1° C./min to remove the solvent and the organic structure directing agents (OSDA). The coated nanosheet films can then be hydrothermally treated to reduce inter-particle gaps. Hydrothermal treatment can be carried out by gel-free growth. Gel-free growth is a hydrothermal treatment technique in which an MFI film grows while maintaining a b-out-of-plane orientation. For instance, the growth can be carried out by first impregnating the zeolite coated support by a solution containing organic structure directing agent (OSDA). Following this, the impregnated support can be heated to achieve zeolite growth. In an example growth, nanosheet coated silica support structures can be soaked in the solution of 0.025M tetrapropyl ammonium hydroxide (TPAOH). Soaked disks can be placed in a Teflon lined stainless steel autoclave and heated to 190° C. for 36 hours. At the end of hydrothermal treatment, the disks can be calcined at 480° C. for 4 hours with the heating and cooling rate of 0.5° C./min to remove TPAOH from the zeolite pores.

While one example zeolite membrane formation technique is described above, this is merely one example. Other formation techniques can be used, depending on the implementation.

Figure 9A:
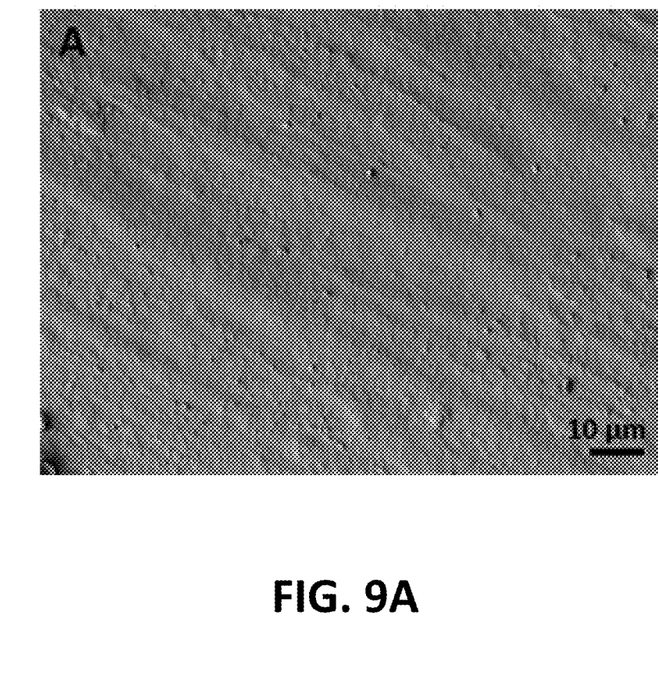
FIGS. 9A-B show SEM images of MFI-nanosheets film on a silica support structure formed by an example implementation of process 200.
Figure 9B:
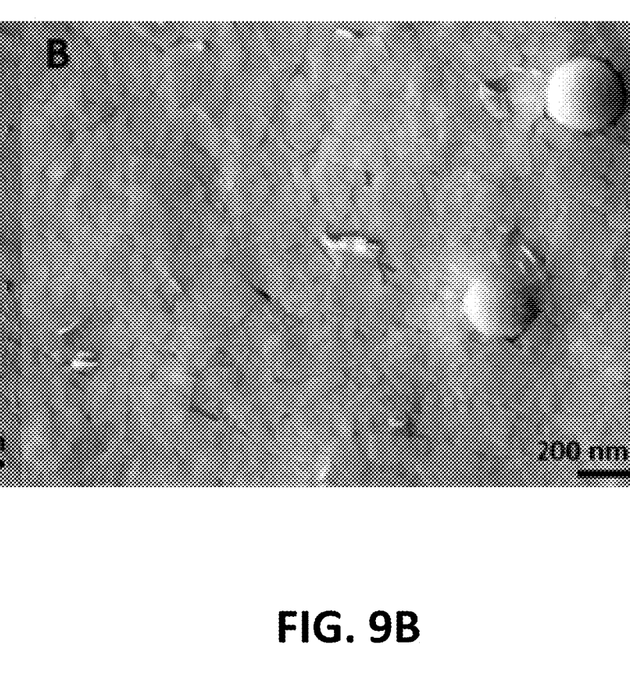

FIGS. 9A-B show SEM images of MFI-nanosheets film on a silica support structure formed by an example implementation of process 200. As shown in FIG. 9A, the nanosheet deposit sits uniformly over the 50 nm silica layer of the silica fiber support. As shown in FIG. 9B, the MFI-nanosheet coating is b-oriented (e.g., MFI b-axis pointing perpendicular to the support). In some implementations, this is highly desired as b-oriented MFI membranes have shown better performance in separating molecules in some cases.

Figure 10:
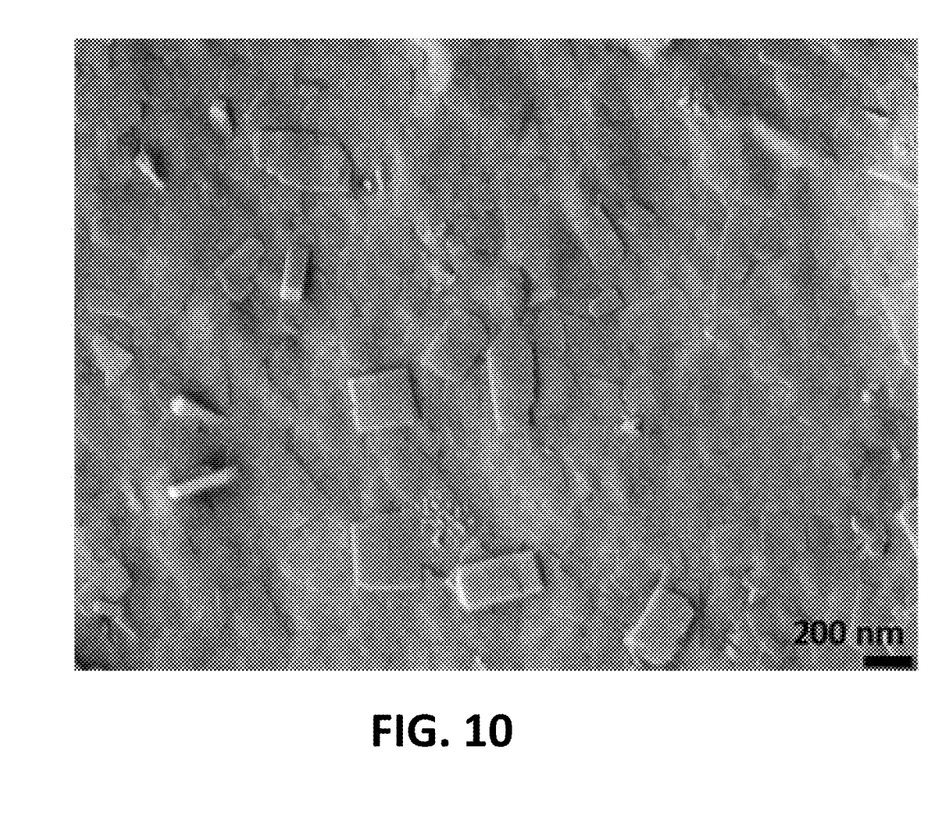
FIG. 10 shows an intergrowth of an example MFI-nanosheet.

In some cases, hydrothermal treatment can lead to inter-growth of MFI-nanosheets (e.g., as shown in FIG. 10), reducing the inter-particle gaps. In an example implementation, intergrown nanosheet films can be used to separate an equimolar mixture of p- and o-xylene. For example, three intergrown films supported on a silica support structure can separate p-xylene from o-xylene with separation factor of 30-50 and p-xylene permeance of $2-4 \times 10^7$ mol/m²-s-Pa.

Silica support structures can be characterized using a variety of techniques. In some implementations, silica support structures can be characterized by scanning electron microscopy (SEM), for example using a JEOL 6700 and JEOL 6500 microscope operating at 1.5 kV can be used to obtain SEM images. In some implementations, mercury porosimetry of silica support structures can be carried out using a mercury intrusion analyzer, for example a Mercury Intrusion Analyzer PM 60 from Quantachrome Inc.

In some implementations, strength measurement of various supports can be carried out using a biaxial flexural test. In an example ring-on-ring test, a support disk (e.g., having a diameter of approximately 22 mm) can be sandwiched between two Viton O-rings (e.g., a support and loading ring). The outer diameter (O.D.) and inner diameter (I.D.) of the support and loading rings can vary, depending on the application. For example, in some implementations, the support ring O.D. and I.D. are 18 mm and 14 mm, respectively, and the loading ring O. D. and I. D. are 10 mm and 6 mm, respectively. During testing, a force is applied (e.g., by a stainless steel platen, such as a MTS Bionix steel compression plate, attached to a mechanical strength testing instrument, such as a MTS Qtest Q10). The compression force required to break the support disk is measured (e.g., by a load cell attached to the compression platen).

Gas permeance through various supports can be measured by flowing pressurized gases ($H_2$, He, $CO_2$, and $N_2$) on one side of the support, while measuring the gas flow using a bubble flow meter at atmospheric pressure on the other side of the support. Permeances of xylene isomers through MFI membranes can be measured by the method reported before.

Implementations of the above techniques (e.g., implementations of process 200 and, if desired, subsequent treatments of the surfaces of the silica support structure) can be used to produce silica support structures of high strength. For example, in some implementations, these silica support structures have approximately three times higher strength (e.g., 18.2±0.5 MPa) than that of exemplary Stöber silica supports (e.g., 5.6±3.2 MPa), as measured by a biaxial flexural strength test. In some cases, these silica support structures have a bi-axial flexural strength of approximately 20 MPa. Although in some implementations, the flexural strength of these silica support structures may be lower than that of alumina supports (e.g., 57±5.9 MPa), they do not break during module assembly and membrane operation. Thus, implementations of process 200 can be used to fabricate high performance membranes.

Implementations of the above techniques (e.g., implementations of process 200 and, if desired, subsequent treatments of the surfaces of the silica support structure) can also be used to produce silica support structures having a variety of different characteristics. Each of these different silica support structures can be suitable for different purposes (e.g., for the separation of a particular type of molecule from another particular type of molecule). The single gas permeance of an example silica support structure (or the degree to which the structure admits a flow of a single particular gas) is shown in Table 1.

TABLE 1

Single gas permeance of example silica support structures.

| | Permeance (mol/m²-s-Pa) | |
| --- | --- | --- |
| | Polished Silica Support Structure | Silica Support Structure Rubbed with 500 nm silica particles |
| $H_2$ | $7.5 \times 10^{-5}$ | $6.4 \times 10^{-5}$ |
| He | $3.9 \times 10^{-5}$ | $3.6 \times 10^{-5}$ |
| $N_2$ | $3.1 \times 10^{-5}$ | $2.9 \times 10^{-5}$ |
| $CO_2$ | $3.5 \times 10^{-5}$ | $2.6 \times 10^{-5}$ |

As shown in Table 1, the single gas permanence (e.g., permeance with respect to $H_2$, He, $N_2$, or $CO_2$) can be varied by performing different surface treatment techniques. As an example, in the example shown in Table 1, a silica support structure that is polished (e.g., using an implementation of the polishing technique described above) (left column) has a greater single gas permeance than a silica support structure that is polished and rubbed with 500 nm silica particles (e.g., using an implementation of the rubbing technique described above) (right column). Accordingly, a silica support structure can be formed using different combinations of the above described techniques, and each of techniques can be individually tuned, in order to produce a silica support structure with the desired characteristics. For example, in some implementations, the silica support structure can be formed such that it has a nitrogen permeance in a range of approximately $3 \times 10^{-5}$ to $8 \times 10^{-5}$ mol/m2 sPa.

As described above, Stöber particles can be used for various purposes during the production of a silica support structure. For example, Stöber particles can be rubbed on a surface of a silica support structure, and slip casted onto a surface of a silica support structure (e.g., as a part of a silica suspension). Stöber particles can be produced using a variety of techniques. In one example, tetraethyl orthosilicate (TEOS, 98%), ammonia solution (29% w/w), water and ethanol are mixed in a stoichiometric proportion as shown in the Tables 2 and 3. The synthesis procedure is optimized to obtain a narrow particle size distribution. For example, a specified amount (e.g., as shown in Table 3) of TEOS and ethanol can be mixed in a conical flask (flask A). Similarly, another specified amount (e.g., as shown in Table 3) of water, ethanol and ammonia solution can mixed in a separate conical flask (flask B). After approximately 10 minutes of stirring, mixture from flask A is transferred to the stirring mixture in the flask B. For the synthesis of 50 nm silica particles, the mixture in flask A is added instantaneously to flask B. In the case of 500 nm silica particles, the mixture in flask A is transferred to flask B using a peristaltic pump (40 ml/minute). After stirring for 3 hours, the Stöber silica particles are collected using centrifugation.

TABLE 2

Molar composition of reactants for an example synthesis of Stöber silica particles.

| Particle Size | TEOS | Ammonia | Water | Ethanol |
| --- | --- | --- | --- | --- |
| 50 nm | 1 | 0.43 | 53.6 | 58.6 |
| 500 nm | 1 | 11.8 | 50 | 52.3 |

TABLE 3

Detailed composition of reactants for an example synthesis of 50 nm and 500 nm sized Stöber silica.

| Particle size (batch volume) | Beaker A | Beaker B |
|---|---|---|
| 50 nm (320 ml batch) | EtOH: 111.28 g<br>TEOS: 17.20 g | EtOH: 111.28 g<br>H$_2$O: 78.18 g<br>NH$_3$ solution (29% w/w): 2.08 g |
| 500 nm (1800 ml batch) | EtOH: 473.41 g<br>TEOS 81.99 g | EtOH: 473.41 g<br>H$_2$O: 160.92 g<br>NH$_3$ solution (29% w/w): 272.23 g |

Different sized silica particles can be collected using various techniques. As an example, 50 nm sized Stöber silica particles are collected by centrifugation at 20,000 relative centrifugation force (RCF) for 3 hours. The wet cake containing silica particles are dispersed in ethanol to obtain a 1% (w/w) suspension.

As another example, 500 nm Stöber silica particles collected by washing with water several times to remove the unreacted polymeric silica and ammonia. Washed silica particles are flocculated by adding concentrated hydrochloric acid to prevent formation of close packed silica during drying. Flocculated silica re dried at 70° C. and heat treated at 1000° C. for 3 hours with the heating and cooling rates of 2° C./min and 4° C./min, respectively.

Different types of Stöber silica particles can be produced while maintaining a particular general size. For example, about 1.134 g of the 500 nm Stöber silica particles described above can be powdered in a mortar and pestle. Powdered particles are dispersed in water by stirring followed by bath sonication for 3 hours. Aggregated large particles are removed by centrifugation at 300 RCF for 10 minutes. Following this, the segregated silica particles in the supernatant are collected by centrifugation and dispersed in 144 ml ethanol. This results in a suspension of heat-treated 500 nm Stöber silica particles.

Different varieties of silica particles can be used for different purposes. For example, 500 nm Stöber silica particles (e.g., produced using the techniques described above) can be used for rubbing the surface of a silica support structure, while a suspension of heat-treated 500 nm (e.g., produced using the techniques described above) can be used for slip casting. Further, while particular example techniques are described above to create Stöber silica particles, these examples are merely to illustrate how different sized particles and different varieties of particles (e.g., pre-sintered particles, particle suspensions, etc.) can be produced. The above examples can be modified, depending on the implementation.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. For example, although the above silica support structures are described as supporting zeolite membranes, implementations of these silica support structures can be used in conjunction with other types of membranes (e.g., metallic membrane, ceramic membranes, amorphous silica membrane, carbon based membranes, organic-inorganic composite membrane, and polymer membranes).

Accordingly, other implementations are within the scope of the following claims.

What is claimed is:

1. A silica support, comprising:
   a porous layer of interconnected silica particles suitable for supporting a zeolite membrane;
   wherein the layer has a nitrogen permeance in a range of approximately $3\times10^{-5}$ to $8\times10^{-5}$ mol/m$^2$ sPa; and
   wherein the layer of interconnected silica particles comprises interconnected anisotropic silica fibers.

2. The silica support of claim 1, wherein the layer of interconnected silica particles has inter-particle gaps that are less than 10 μm.

3. The silica support of claim 1, wherein each anisotropic silica fiber has an aspect ratio in the range of approximately 2 to 10.

4. The silica support of claim 1, wherein the silica support has a bi-axial flexural strength of 18.2±0.5 MPa as measured by a ring-on-ring test using two Viton O-rings.

* * * * *